United States Patent [19]

Kautt

[11] Patent Number: 5,121,559

[45] Date of Patent: Jun. 16, 1992

[54] METHOD AND DEVICE FOR RECOGNIZING STANDARD SIZE PARTS

[75] Inventor: Jean-Jacques Kautt, Strasbourg, France

[73] Assignee: Ferco International Usine de Ferrures de Batiment, Sarrebourg, France

[21] Appl. No.: 625,443

[22] Filed: Dec. 11, 1990

[30] Foreign Application Priority Data

Dec. 12, 1989 [FR] France ............................... 89 16415

[51] Int. Cl.⁵ ............................................. G01B 5/00
[52] U.S. Cl. ....................................... 33/783; 33/545; 33/549; 33/805
[58] Field of Search .................. 33/803, 783, 784, 805, 33/545, 549, 791

[56] References Cited

U.S. PATENT DOCUMENTS

| | | |
|---|---|---|
| 2,244,964 | 6/1941 | Poock et al. ............ 33/791 X |
| 3,629,947 | 12/1971 | Meier ....................... 33/791 |
| 4,700,485 | 10/1987 | Caulfield . |

Primary Examiner—Harry N. Haroian
Attorney, Agent, or Firm—Wegner, Cantor Mueller & Player

[57] ABSTRACT

A device for recognizing different type parts, each type having a predetermined dimension, comprises an abutment against which one side of the part is positioned, a mobile feeler including a mobile abutment adapted to be brought into contact with the other side of the part and a sensor comprising at least one masking member fastened to the feeler and at least one fixed sensor. The device is adapted to be fitted to a machine for processing window or French-window frames to determine the type of frame to be processed.

4 Claims, 4 Drawing Sheets

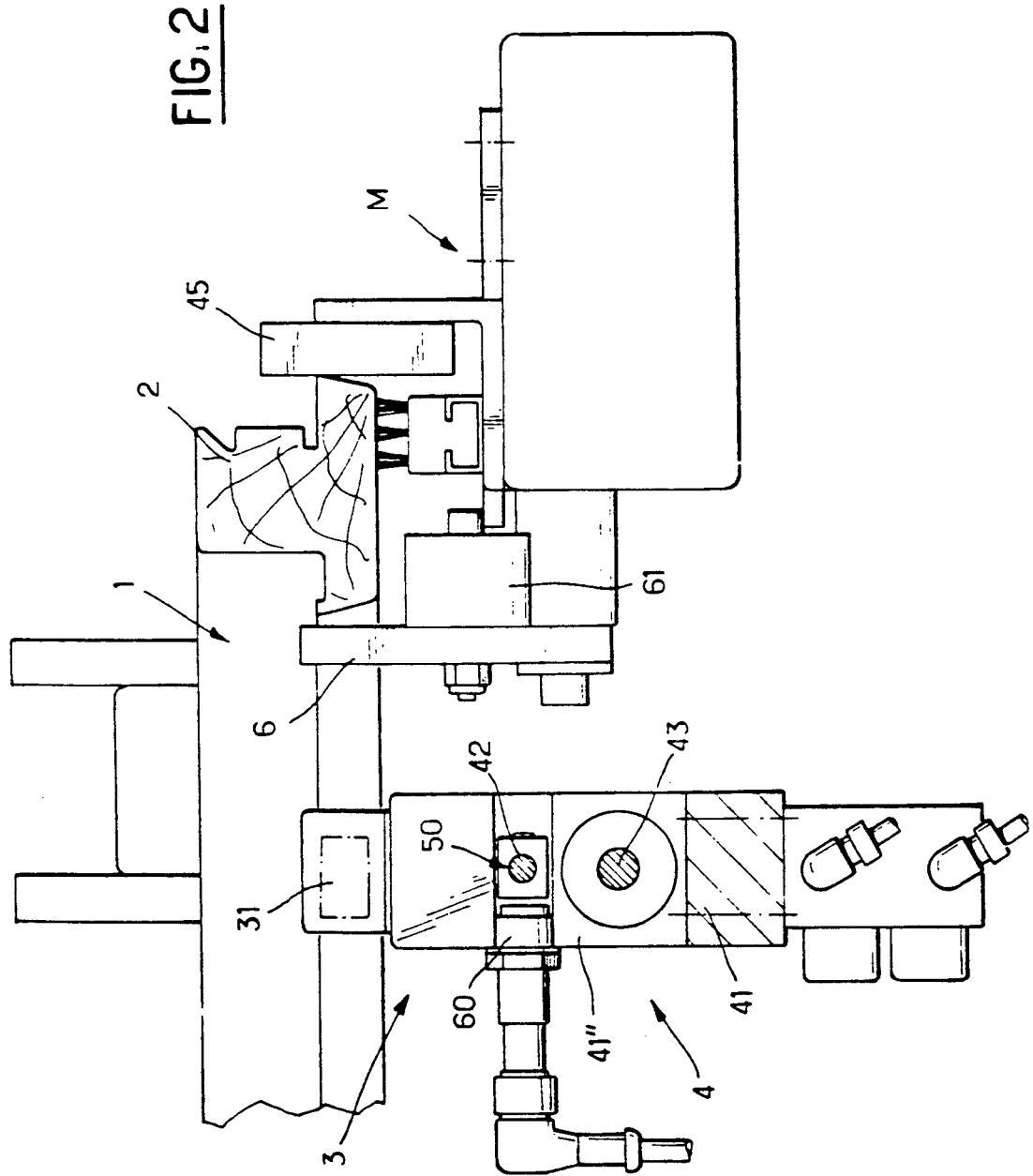

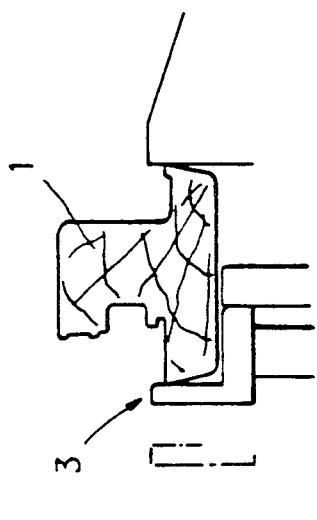
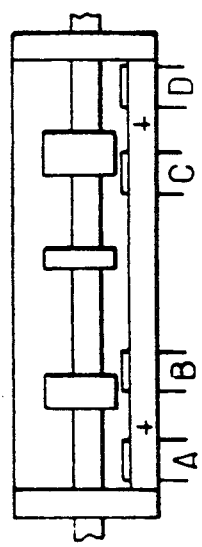
FIG. 3C
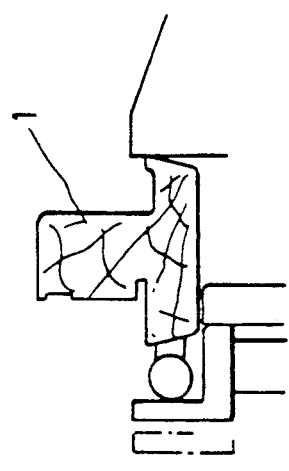
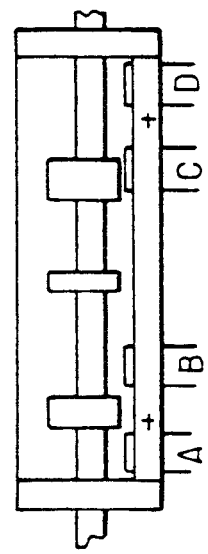
FIG. 3B
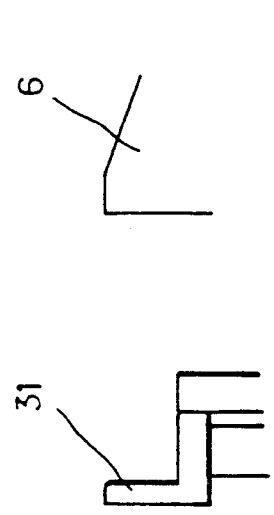
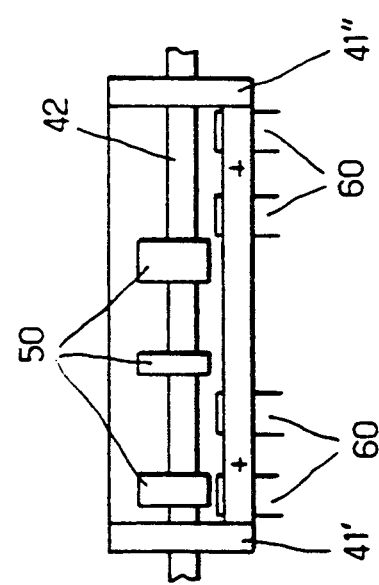
FIG. 3A 5,121,559

METHOD AND DEVICE FOR RECOGNIZING STANDARD SIZE PARTS

BACKGROUND OF THE INVENTION

1. Field of the Invention

The present invention concerns a method and a device for recognizing standard size parts.

To be more precise, the device is designed to be fitted to a machine for processing window and French-window frames.

2. Description of the Prior Art

The problem in such machines is to determine the type of frame fed to the machine in order to set up the characteristics of the relevant equipment, each frame type having standard size characteristics. The solution is therefore to use a simple and reliable device to determine the appropriate dimension of the part and to transmit this information, possibly modified by the application of a prerecorded parameter, to the device controlling the machine.

This device, particularly well suited to a machine for fitting out window frames, can obviously be used in any application where it is necessary to identify and recognize parts in order to process them appropriately.

The invention proposes a recognition device comprising a feeler and a corresponding detector, the association of these two parts enabling the type of part, and in particular, in the case of a machine for fitting out window frames, the type of opening frame and the direction of opening, to be deduced logically. It would be possible to provide a feeler for each part to be identified, but this would result in proliferation and complication of the computer processing parameters. The invention achieves the same effects with a limited number of combinations.

SUMMARY OF THE INVENTION

In one aspect, the present invention consists in a method of recognizing different type parts, each type having a predetermined size, characterized in that at least one masking member is moved and positioned according to the dimension of the type of part by means of a feeler device, said at least one masking member cooperating with at least one fixed sensor, the members masking the sensors in multiple combinations to provide information depending on the identified dimension specific to the type of part present.

To optimize the arrangement and the combinations, the positioning of the masking members and of the sensors is defined according to the number and the sizes of the parts to be identified.

To achieve the required control, the information is modified by applying a prerecorded parameter depending on the part type and the modified information conditions the parameters for processing the part.

In another aspect, the present invention consists in a device for recognizing different type parts, each type having a predetermined dimension; the device comprises an abutment against which one side of the part is positioned, a mobile feeler including a mobile abutment adapted to be brought into contact with the other side of the part and a detector comprising at least one masking member fastened to the feeler and at least one fixed sensor.

In a preferred embodiment, the detector includes a shaft which is supported for movement in translation by fixed bearings, which carries and has attached to it the masking members and which is attached to the feeler.

Preferably, the detector comprises a second shaft parallel to the first shaft supported by the same bearings and adapted to stiffen the detector mechanism.

A preferred application of the recognition device is to a machine for processing window and French-window frames in order to determine the type of frame to be processed; in this specific application, the abutment is located at a reference corner to which the device feeding the machine brings one side of the upright of an opening window frame, the feeler is moved in translation relative to the fixed chassis of the machine into contact with the other side of the upright of the frame, and the detector is supported by a support part fastened to the chassis of the machine.

The invention is described in more detail below with reference to diagrammatic drawings showing one embodiment of the invention.

BRIEF DESCRIPTION OF THE DRAWINGS

FIG. 2 is a view in cross-section on the line 1—1 in FIG. 1 of the device in accordance with the invention fitted to a machine for processing opening window frames.

FIGS. 3A through 3F are schematic views of the operation of the device in relation to different types of opening window frame uprights.

DETAILED DESCRIPTION OF THE INVENTION

The figures show the device and the method of recognizing different type parts applied to recognizing uprights of opening window frames. The device is therefore fitted to a frame processing machine, for example a machine for fitting seals, a machine for fitting lock parts or any other automatic machine for fitting or otherwise processing opening window frames.

Figure 1:
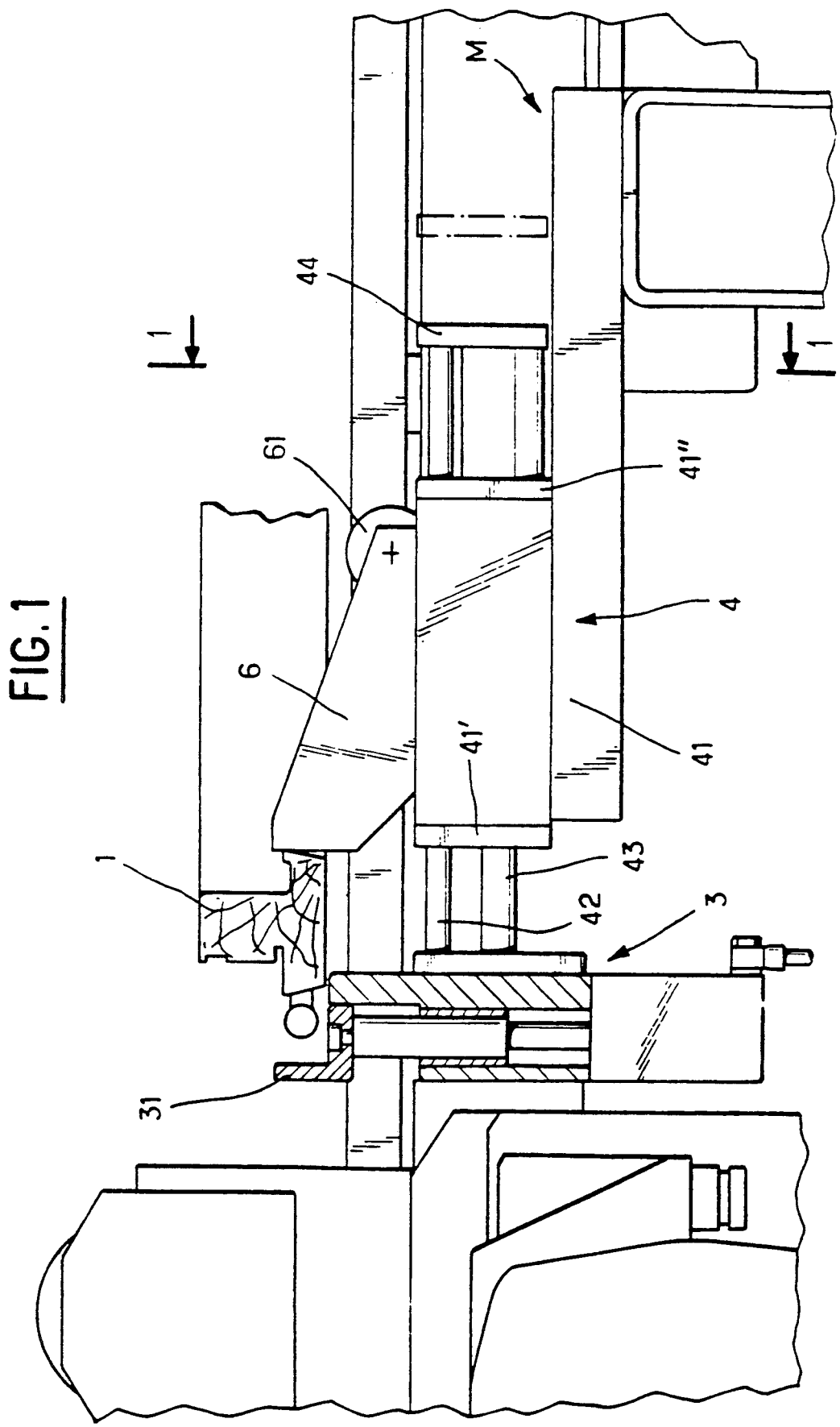
FIG. 1 is a front view of the device in accordance with the invention fitted to a machine for processing opening window frames, showing the device partly in cross-section.

FIGS. 1 and 2 show the recognition device in accordance with the invention.

The device comprises a first abutment 6 movable relative to the chassis M of the machine. The upright 1 is brought into contact with the first abutment 6. The opening frame is preferably abutted against a fixed edge 45 which constitutes part of the device for supplying or feeding frames to the machine. The abutment 6 determines the reference corner of the frame and the clamping of the latter to the table of the machine is completed by securing parts applied to the other upright of the frame, for example. The abutment 6 is movable about an axis and provided with a counterweight 61 which returns it automatically to the projecting active position when the opening frame has passed.

Referring to FIGS. 1 and 2, the opening window frame is placed on the table of the machine with its inside surface resting on the table and its outside surface facing upwards in the case of an opening frame designed to open inwards. The upper crossmember 2 lies against the edge 45.

The recognition device further comprises a feeler 3 and a detector 4.

The feeler 3 is mobile on the machine by virtue of a translation device using rails or the like, for example, and is driven by a pneumatic device described later.

Projecting from the plane of the table of the machine, an abutment 31 is moved into contact with the opposite side of the upright 1. The thickness of the upright 1 can therefore be determined from the distance between the first abutment 6 and the mobile second abutment 31.

The detector 4 is mounted near the feeler 3 on the chassis M of the machine. It has a mobile part coupled to the feeler 3 and a fixed part fastened to the chassis of the machine.

For this purpose there are fastened to the feeler 3 two shafts 42 and 43 which slide in fixed bearings 41' and 41 of the sensor. The ends of the shafts are joined by a plate 44 or the like for increased stiffness.

The construction of the detector 4 is seen particularly clearly in FIG. 2.

The detector 4 is mounted on a support part 41 fastened to the chassis M of the machine.

The first horizontal shaft 42 carries at least one masking member 50 fastened to the shaft 42. The detector 4 further comprises at least one sensor 60 fixed to the fixed part of the detector 4.

The shaft 42 carries the masking members 50 and the shaft 43 is the translation drive shaft actuated pneumatically, this shaft forming a system of slide valves within the detector 4.

Consequently, the masking members 50 are moved and positioned according to the movement and the positioning of the mobile abutment 31 and depending on the dimensions of the upright 1 either cut off or do not cut off the light beam, magnetic field or other sensing means of the sensors 60.

The operation of the recognition device as applied to identifying opening window frames will now be described in more detail with reference to FIGS. 3A through 3F.

The objective of the device is to determine the opening frame type and its mode of opening. In other words, the task is to determine the opening frame type and to identify whether it is a lefthand or righthand frame of this type in order, in the case of a seal fitting machine, to command the location at which the seal is fitted (on four or three sides), or in the case of a machine for fitting lock parts, the location and type of lock part to be fitted, and so on.

To illustrate this operation FIGS. 3A through 3F show schematically in front view the first abutment 6 and the mobile second abutment 31 of the feeler 3, transversely in contact with an upright 1 of an opening window frame together with a schematic plan view of the detector 4 with the shaft 42 carrying the masking members 50 sliding in the bearings 41' and 41" and the fixed sensors 60.

FIG. 3A shows the maximum open position of the feeler 31 and the corresponding positions of the masking members 50.

FIG. 3B shows an upright fitted with hinge members which articulate the opening frame to the fixed frame. In this case only sensor C is masked and the device in accordance with the invention recognizes that it is a righthand-opening frame for windows or French windows with one or two opening frames, the frame having been fed onto the table of the processing machine in the position already explained.

In FIG. 3C sensors B and C are masked and this identifies, in the case of an espagnolette bolt equipped upright, an opening frame opening to the left for windows or French windows with a single opening frame.

Figure 3D:
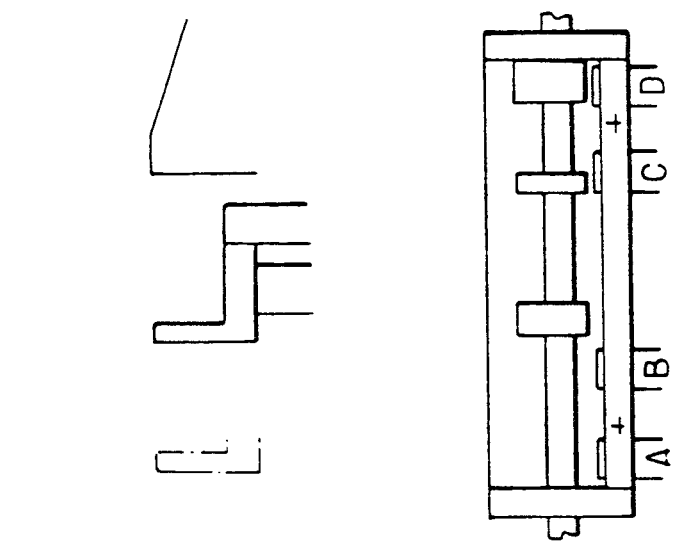

In FIG. 3D only sensor B is masked and, for an opening frame upright, this identifies the presence of a tilting frame so that the crossmember to be fitted out can be determined.

Figure 3E:
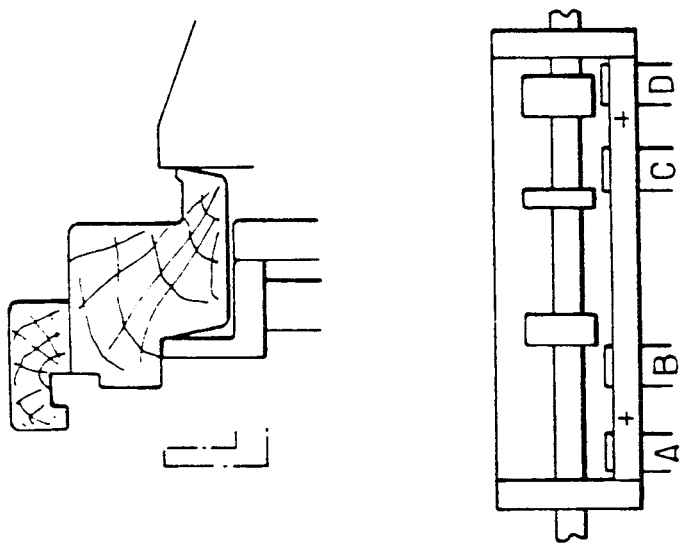

In FIG. 3E only the sensor D is masked and in the case of an opening frame upright identifies the presence of a lefthand opening frame of second opening frame of a window or French-window with two opening frames.

Figure 3F:
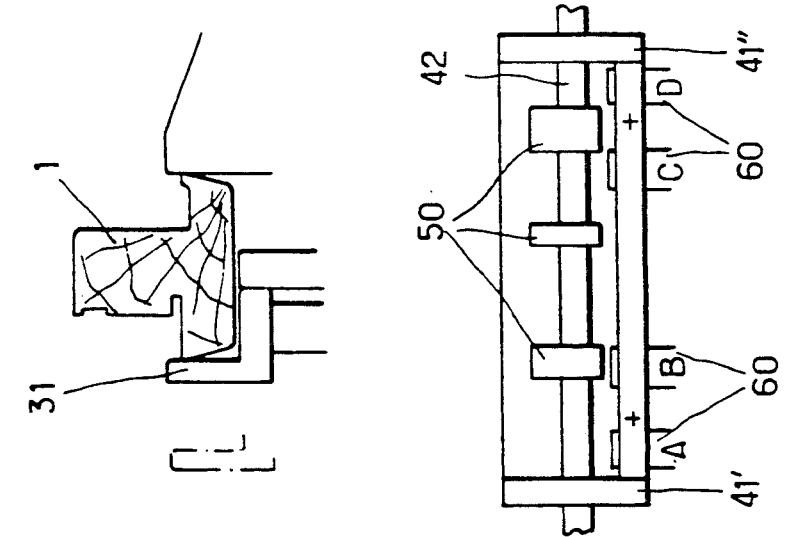

FIG. 3F shows the end of travel position of the mobile abutment and therefore the absence of any opening frame on the table of the machine.

In the arrangement shown the detector comprises four inductive sensors 60 and three masking members 50. It is therefore possible to determine six parameters, as shown in FIGS. 3A through 3F. It is obvious that by modifying the number of sensors and the number of masking members it is possible to increase the number of combinations and therefore to adapt the device in accordance with the invention to a greater or lesser number of identifiable types of part.

The combination of inductive sensors 60 and masking members 50 makes it possible to achieve combinations defining the presence or the absence of metal parts in the form of the masking members in relationship to the sensors and to transmit this information in the form of pulses to the machine control system. It is therefore sufficient to modify the prerecorded parameters to adapt the recognition method and device to identifying types of uprights with different sizes.

This embodiment is not limited by the fixed conditions of parametering the frame such as the arrangement of the interior surface and of the upper crossmember relative to the machine.

There is claimed:

1. A device adapted to be fitted to a machine for processing window or French-window frames, said device determining the type of frame to be processed, each type of frame having a predetermined dimension, said device comprising:
    an abutment against which one side of the frame is positioned, said abutment being located at a reference corner to which a device feeding the machine brings one side of an upright of an opening window frame;
    a mobile feeler including a mobile abutment adapted to be brought into contact with the other side of the frame, said feeler being movable relative to a chassis of the machine into contact with the other side of the upright of the frame; and
    a dector, said detector being mounted on a support fastened to the chassis of the machine, said detector including a plurality of masking members fastened to said mobile feeler, said masking members being moved and positioned via said mobile feeler according to the dimension of the type of frame, said detector also including a plurality of fixed sensors which cooperate with said masking members in multiple combinations to provide information depending on the identified dimension specific to the type of frame present.

2. Device according to claim 1 wherein the detector includes a shaft which is supported for movement in translation by fixed bearings, which carries and has attached to it the masking members and which is attached to the feeler.

3. Device according to claim 2 wherein the detector comprises a drive shaft parallel to the first shaft supported by the same bearings.

4. Device according to claim 1 wherein the abutment is adapted to pivot about a horizontal axis and is provided with a counterweight for automatically returning it to its active position.

* * * * *